E. B. Smith,
Cage Trap,
N° 79,506. Patented June 30, 1868.
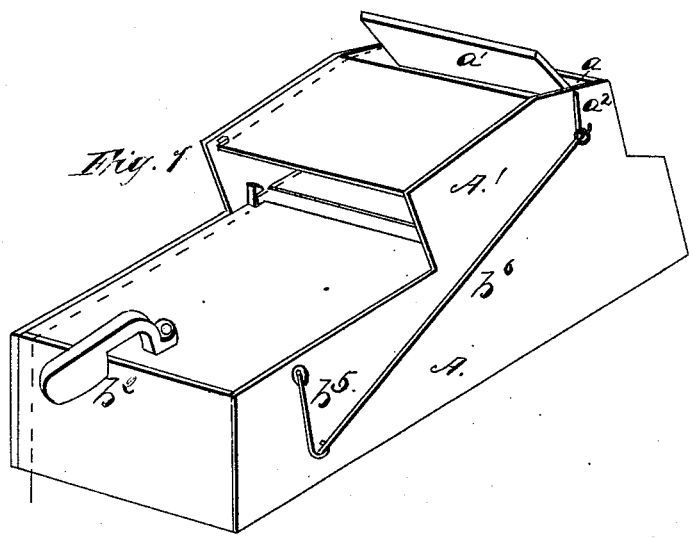
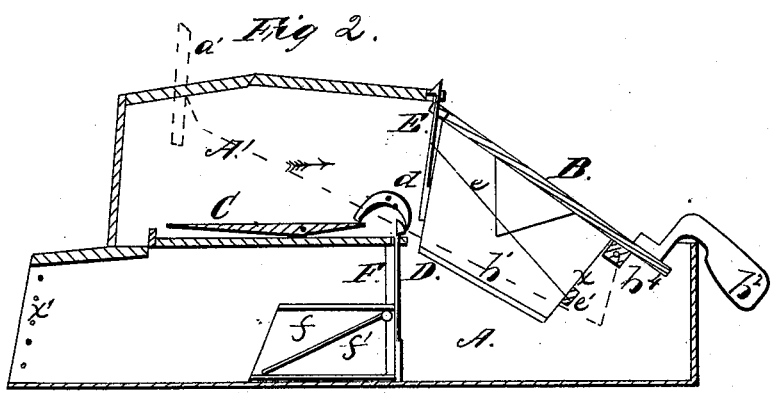
Witnesses
Frederic Thomas
W. E. Stumph.
Inventor
E. B. Smith by
N. W. Beadle atty

United States Patent Office.

E. B. SMITH, OF MARIETTA, OHIO.

Letters Patent No. 79,506, dated June 30, 1868.

IMPROVED ANIMAL-TRAP.

*The Schedule referred to in these Letters Patent and making part of the same.*

TO ALL WHOM IT MAY CONCERN:

Be it known that I, E. B. SMITH, of Marietta, in the county of Washington, and State of Ohio, have invented new and useful Improvements in Animal-Traps; and I do hereby declare that the following is a full and exact description of the same, reference being had to the accompanying drawings and to the letters of reference marked thereon.

This invention relates to certain improvements in animal-traps, which consist principally in an arrangement of pivoted platforms, which are operated by the weight of the animal, as will be fully described hereinafter.

Figure 1 represents a perspective view, and
Figure 2 a sectional view of my trap.

In the drawings—

A A' represent a box, of peculiar shape, as shown, provided upon its upper side with the opening $a$.

B represents a platform, which consists of a box with bottom, $b^1$, and weight, $b^2$, which box is pivoted to the shaft $b^4$, which latter is provided with the crank $b^5$, which connects with the rod $b^6$, running to the crank, $a^2$, of the pivoted cover $a^1$.

C also represents a pivoted platform, placed within the cap A', upon which the bait is placed.

D represents a spring-catch, attached to the side of the box, which, when free, holds the platform B in place. $d$ represents a curved lever, one end of which hooks over the spring-catch D, and the other rests upon one end of the platform C.

This lever is so arranged, that when the rear end of the platform C is depressed, the spring-catch is drawn back, the platform B is liberated, and its inner end flies up on account of the weight $b^1$.

E represents a spring-catch, attached to the inner end of the platform B, which catches into a notch in the cap A' when elevated. $e$ represents a cord or wire, which runs from the catch E to the back of the box of the platform B, where it is attached to the flat spring $e'$.

F represents a partition, running across the box, at about the middle of it, in which is placed the passage $f$, provided with trap-door, $f'$, of the usual construction.

From this description the nature and operation of my invention will be evident.

Upon the platform C, within the cap A', is placed bait or enticing-material, to get which the animal must advance on the platform C, to which the trap-door $a$ admits light. As soon as the animal has advanced past the centre of motion of the platform C, his weight operates on the spring-catch D, by means of the lever $d$, which sets loose the platform B, which rises by the centre weight $b^2$, closing the opening at which the animal entered; the opening $a$ being closed at the same time by the rod $b^6$, the catch at E secures it in that position.

The animal, then seeking to extricate himself, sees daylight at $x$, and looks in that direction for liberty.

In making an effort of his strength, he will not fail to try the rear end of the box, part of which is formed of the wide spring $e'$. Any pressure against this will set off the catch at $e$, and the weight of the animal will be sure to set the trap in its former position, and, at the same time, will permit him to make what he may suppose to be his exit at the hole $f$, which is provided with a trap-door, $f'$; which prevents his returning, and the same operation may be continued until the chamber is full.

Having thus described my invention, what I claim as new, and desire to secure by Letters Patent, is—

The box A A', with platforms B C, constructed as described, spring-catches D E, flat spring $e'$, passage $f$, and trap-door $f'$, the whole being combined and arranged substantially as described.

This specification signed and witnessed, this fifth day of March, 1868.

E. B. SMITH.

Witnesses:
S. T. JEWELL,
WM. GLINES.